(12) United States Patent
Becker et al.

(10) Patent No.: US 8,057,102 B2
(45) Date of Patent: Nov. 15, 2011

(54) BEARING HOUSING

(75) Inventors: Markus Becker, Muenster (DE); Vincent Schellings, Enschede (NL); Peter Gauchel, Muenster (DE); Nicolas Delucis, Muenster (DE)

(73) Assignee: General Electric Company, Schenectady, NY (US)

( * ) Notice: Subject to any disclaimer, the term of this patent is extended or adjusted under 35 U.S.C. 154(b) by 1010 days.

(21) Appl. No.: 10/532,393

(22) PCT Filed: Sep. 19, 2003
(Under 37 CFR 1.47)

(86) PCT No.: PCT/EP03/10470
§ 371 (c)(1),
(2), (4) Date: Oct. 19, 2007

(87) PCT Pub. No.: WO2005/028862
PCT Pub. Date: Mar. 31, 2005

(65) Prior Publication Data
US 2008/0063525 A1 Mar. 13, 2008

(51) Int. Cl.
*F16C 35/00* (2006.01)
(52) U.S. Cl. .................................. 384/428; 416/132 B
(58) Field of Classification Search ............... 384/428, 384/438–445, 510, 537, 559, 584, 585; 416/132 B, 416/196 A, 223 B, 227, 243
See application file for complete search history.

(56) References Cited

U.S. PATENT DOCUMENTS

| | | | | |
|---|---|---|---|---|
| 2,341,911 A | * | 2/1944 | Drexler et al. | 440/37 |
| 2,972,327 A | * | 2/1961 | Paul | 440/37 |
| 3,386,242 A | * | 6/1968 | Trapp | 60/791 |
| 4,015,555 A | * | 4/1977 | Tinkham | 440/37 |
| 4,088,420 A | * | 5/1978 | Jacobs et al. | 416/9 |
| 4,498,017 A | * | 2/1985 | Parkins | 290/44 |
| 4,545,728 A | * | 10/1985 | Cheney, Jr. | 416/140 |
| 4,613,282 A | * | 9/1986 | Wood | 416/36 |
| 4,757,211 A | | 7/1988 | Kristensen | |
| 4,815,936 A | * | 3/1989 | Stoltze et al. | 416/9 |
| 5,082,465 A | * | 1/1992 | Wine | 440/37 |
| 5,161,952 A | * | 11/1992 | Eggers, Jr. | 416/223 R |
| 5,315,159 A | * | 5/1994 | Gribnau | 290/55 |
| 7,258,644 B2 | * | 8/2007 | Ziech et al. | 475/221 |
| 2003/0080566 A1 | | 5/2003 | Becker et al. | |

FOREIGN PATENT DOCUMENTS

| | | |
|---|---|---|
| DE | 4104454 C1 | 7/1992 |
| DE | 10247072 A1 | 4/2004 |
| EP | 1291521 A1 | 3/2003 |

OTHER PUBLICATIONS

International Search Report for PCT/EP03/10470, mailed on Jun. 1, 2004, pp. 3 total.

(Continued)

*Primary Examiner* — Marcus Charles
(74) *Attorney, Agent, or Firm* — Blakely, Sokoloff, Taylor & Zafman LLP

(57) ABSTRACT

The present invention provides a bearing housing (10) for accommodating a rotor shaft (33) of a wind turbine. The bearing housing includes a flange (12) for connecting the bearing housing to a main frame (30) of the wind turbine. The flange having a connecting surface (51, 52) to be attached to the main frame. Thereby, at least parts of the connecting surface, when seen from the top of the bearing housing, would be located below the rotor shaft.

12 Claims, 4 Drawing Sheets

OTHER PUBLICATIONS

Erich Hau, "Wind Energy Plants; Principles, Technology, Application, Economic Viability", 1996, pp. 244-245, Springer-Publisher, Berlin, Germany.

European Office Action issued in connection with EP Application No. 03818692.2, Apr. 20, 2011.

* cited by examiner

BEARING HOUSING

CROSS-REFERENCE TO OTHER APPLICATIONS

This application is a National Phase Application of and claims the priority of International Application No. PCT/EP2003/010470, filed Sep. 19, 2003.

FIELD OF THE INVENTION

The invention relates to wind turbines. Further, the present invention relates to load transmitting components of wind turbines. Specifically, the present invention relates to bearing housings, main frames and wind turbines.

BACKGROUND OF THE INVENTION

Wind turbines provide a primary source of energy that can be converted into electricity and supplied to utility power grids. Conversion of wind energy to electrical energy is accomplished in a wind turbine by driving an electrical generator, commonly an AC induction generator. Recently, wind turbines have received increased attention as environmentally safe and relatively inexpensive alternative energy sources. With this growing interest, considerable efforts have been made to develop wind turbines that are reliable, efficient, and have increased availability.

However, at high wind speeds or for large wind turbines, the power captured from the wind by the rotor may lead to large loads acting on mechanical components. All components necessary for transmitting the loads to the tower are exposed to these large loads. Thus, components like the bearing housing and the main frame need to have a sufficient strength. Prior art systems typically increase the amount of material to withstand the loads. This may be considered an insufficient approach. Increasing the material strength, for example associates the disadvantage of an increased weight. Thus, there is a need to improve respective components.

BRIEF DESCRIPTION OF THE INVENTION

This object is attained by a bearing housing according to independent claims 1 and 3, a wind turbine according to independent claim 15 and a main frame according to independent claim 13.

Further advantages, features, aspects and details of the invention are evident from the dependent claims, the description and the accompanying drawings.

According to an aspect of the subject invention, a bearing housing for accommodating a rotor shaft of a wind turbine is provided. The bearing housing includes a flange for connecting the bearing housing to a main frame of the wind turbine. The flange has a connecting surface for attaching the bearing housing to the main frame. Thereby, at least parts of the connecting surface, when seen from the top of the bearing housing, is located below the rotor shaft position.

According to another aspect, a flange of a bearing housing has a connecting surface that can be averaged by a plane. The plane of the connecting surface is inclined with respect to the rotor shaft axis by an angle of at least 20°. Typically, this angle could be between 35° and 65°.

In the event of large loads acting on the rotor shaft of the wind turbine, these loads are received by the bearings of the rotor shaft and transferred to the bearing housing. In order to avoid singular load transmittal points, as conventionally used, a flange of the bearing housing as described above is provided. Thereby, the loads are more efficiently transmitted to the tower and the necessity for compensating increasing loads by using more material is reduced. This is achieved by the new design. Utilizing the above aspects, several advantages can be combined. One the one hand, the topology of the bearing housing body can be continued by the topology of the main frame body. This can be used to improve the load transmittal between the components. On the other hand, the flange can be constructed in a manner to reduce the shear rate between the components and to allow a separation of the bearing housing and the main frame. This favors manufacturing, transport and assembly. Thus, constructional aspects and load distribution aspects can be combined by inclining the flange surface.

According to another aspect, the bearing housing is essentially cast as a single component. Thereby, the load transmittal optimized shape can be manufactured without introducing unnecessary stress in the bearing housing body.

According to a further aspect, a bearing housing for accommodating a rotor shaft of a wind turbine is provided. The bearing housing includes a flange for connecting the bearing housing to a main frame of the wind turbine. The flange has a connecting surface for attaching the bearing housing to the main frame. The flange of the bearing housing includes sections which have a curvature.

This aspect also allows for a larger connection surface area, which improves the load transmittal to the main frame.

According to another aspect, the bearing housing is suitable for accommodating two bearings. Typically, these bearings are a locating bearing and a floating bearing. Pooling the two bearings in one housing allows a compact wind turbine design.

According to another aspect, for wind turbines in the range of 1 MW and 4 MW, the flange has a thickness perpendicular to the connecting surface of below 120 mm. Typically, the thickness is between 60 mm and 100 mm. Reducing the loads acting on singular load transmittal points, allows for a reduced material strength. Thereby, the components weight can be reduced.

According to another aspect, a main frame is provided, which includes a flange for connecting the main frame with the bearing housing. The flange of the main frame is constructed to correspond to any of the features described with respect to the bearing housing above.

According to another aspect, a wind turbine is provided including a tower defining a z-axis, a rotor, and a rotor shaft defining an x-axis. The axis of the rotor shaft is located at a y-position $y_s$ and the rotor shaft has a radius r. Further, a main frame and a bearing housing for accommodating the rotor shaft is included. The bearing housing includes a flange for connecting the bearing housing to the main frame. Thereby, the flange includes a connecting surface which is partly positioned at a z-position below the rotor shaft and at the same time at a y-position between $y_s-r$ and $y_s+r$.

According to further aspects, the wind turbine includes any of the features described above with respect to the bearing housing of the wind turbine.

The invention is also directed to methods by which the described apparatus is manufactured. It includes method steps for manufacturing every feature of the apparatus.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIG. 1b shows a view from the gear box side of the bearing housing of the embodiment of FIG. 1a;

DETAILED DESCRIPTION

Figure 1A:
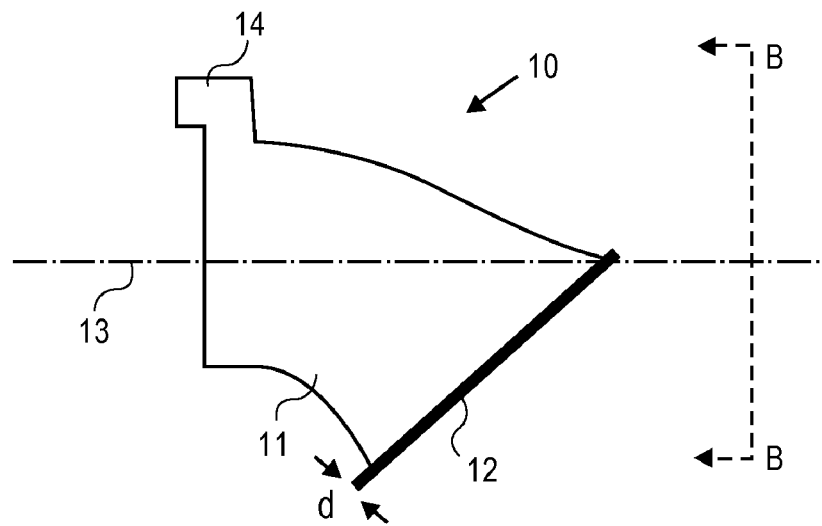
FIG. 1a shows a schematic side view of an embodiment according to the present invention.

Reference will now be made in detail to various embodiments of the invention, one or more examples of which are illustrated in the drawings. In the figures and the description that follows, like reference numerals refer to similar elements. Each example is provided by way of explanation of the invention, and is not meant as a limitation of the invention. For example, features illustrated or described as part of one embodiment can be used on or in conjunction with other embodiments to yield yet a further embodiment. It is intended that the present invention include such modifications and variations.

Figure 1B:
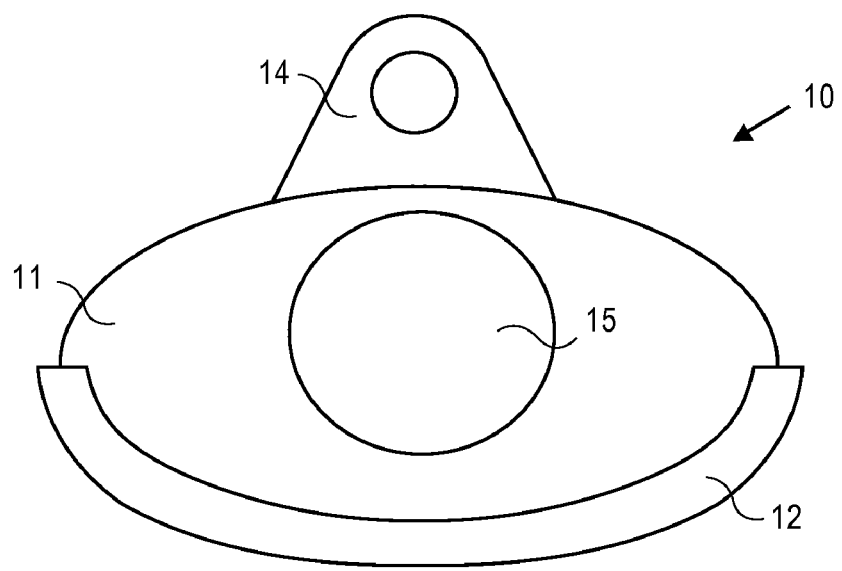

FIG. 1a and FIG. 1b show a bearing housing 10 according to one embodiment. FIG. 1a is a schematic side view of the bearing housing, whereas FIG. 1b is a view from plane B-B.

The bearing housing includes a cast iron body 11. Further, the bearing housing includes an opening 15 for accommodating the rotor shaft of the wind turbine. Reference numeral 13 denotes the rotor shaft axis.

The body 11 is formed to allow for an improved load transmittal of the loads captured via the rotor shaft to the main frame. The loads are transmitted to the main frame via flange 12.

As can be seen in FIG. 1b, the surface of the flange 12 exceeds in a curved form from the left side of the rotor shaft opening to the right side of the rotor shaft opening. Thereby, flange 12 is curved below rotor shaft opening 15. The curvature of the flange has a radius of at least 500 mm, typically between 1200 and 2000 mm. The shape of the flange 12 includes parts, which would be located below the rotor shaft, when seen from the top of the bearing housing.

Flange 12 is formed in one piece in order to increase the connecting surface area. Due to the increased surface area, the loads on the flange can be reduced. The loads are transmitted efficiently to the main frame as will be explained in more detail with respect to FIG. 3.

Prior art systems typically have one or two flanges on each side of the rotor shaft; the flanges are utilized to connect the bearing housing and the main frame. Thereby, discrete and localized spots need to be capable of transmitting the loads. The load distribution at the discrete spots required an increased material strength, especially for wind turbines producing several megawatts of power.

The enlarged area of the connection surface of the flange 12 of the bearing housing 10, as shown in FIGS. 1a and 1b, has an improved characteristic of transmitting the loads to the main frame of the wind turbine. Thus, the flange thickness d can be reduced to a value between 70 and 90 mm.

Independently of specific embodiments, the area of the connecting surface can be increased. Typically, the area would be at least 1.5 m$^2$. This means, the area, as an example, could be between 2 m$^2$ and 4 m$^2$.

As can be further seen in FIGS. 1a and 1b, a rotor stop body 14 is directly connected to the body 11 of bearing housing 10. Rotor stop body 14 is used to guide a stop mechanism to freeze the rotor in the event the rotor should not rotate. This could for example be the case in an off-state of the wind turbine during maintenance or service events. In this embodiment, rotor stop body 14 and bearing housing body, as shown in FIGS. 1a and 1b, are cast as one piece. The rotor stop body can, however, also be attached to the bearing housing.

Figure 2:
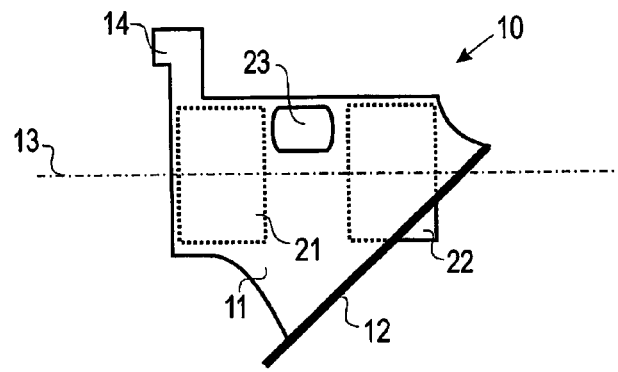
FIG. 2 shows a schematic side view of a further embodiment of the present invention.

Additional details can be seen from the embodiment shown in FIG. 2. Therein, a bearing housing 10, which is comparable to the bearing housing shown in FIG. 1a is shown. In the following the difference of FIG. 2 as compared to FIG. 1a will be described.

FIG. 2 shows two bearings included in the bearing housing 10. Locating bearing 21 and floating bearing 22 both hold the rotor shaft. Having the locating and the floating bearing in the bearing housing, a bearing can be avoided in the gear box. Thus, the two bearings being located close together (around 1 m to 2 m) within one housing consume less space. This results in the option of a more compact design of the wind turbine nacelle.

A further detail shown in FIG. 2, which can also be used independently of specific embodiments, is the assembling and maintenance opening 23. The bearing housing body 11 is cast with an opening 23, so that during assembly or maintenance the access to the bearings and the rotor shaft accommodated in the bearing housing is improved.

In the following reference is made to FIG. 3. Therein, a bearing housing 10, which is connected to a main frame 30 is shown. The bearing housing 10 includes the bearing housing body 11 and the flange 12. Further, a rotor stop body 14 is included. Rotor shaft 33 is located in the bearing housing.

The flange 12 of the bearing housing is connected to a corresponding flange 32 of the main frame. The main frame body 31 is shaped to also smoothly transmit the loads captured by the wind to the tower. The bearing housing body 11 together with the main frame body can be considered to define one topology. This topology is optimized for transmitting the loads to the tower head, which is connected to the main frame at the tower head flange 35.

The separation of the main frame body 31 and the bearing housing body 11 results, amongst others, in the following advantages. First, the two cast components can be more easily manufactured. Second, the individual components can be more easily transported. Third, the assembly and maintenance of the wind turbine is simplified.

Nevertheless, for small wind turbines the bearing housing and the main frame may be cast in one piece. Thereby, disturbance of the load transmittal could be decreased.

Figure 3:
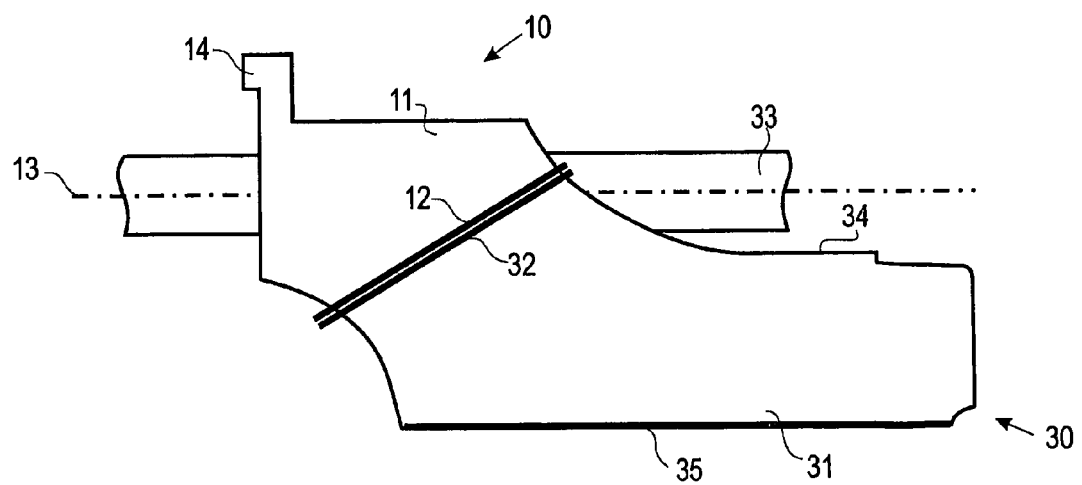
FIG. 3 shows a side view of a further embodiment of the present invention, wherein the bearing housing is connected to a respective main frame.

Assembling means 34, shown in FIG. 3, is used to assemble the gear box of the wind turbine to the main frame. Thereby, transverse forces acting on the gear box are also captured by the main frame. As a result, all forces or loads e.g. transmitted via the rotor shaft 33 can be transferred to the tower head over flange 35.

Figure 4:
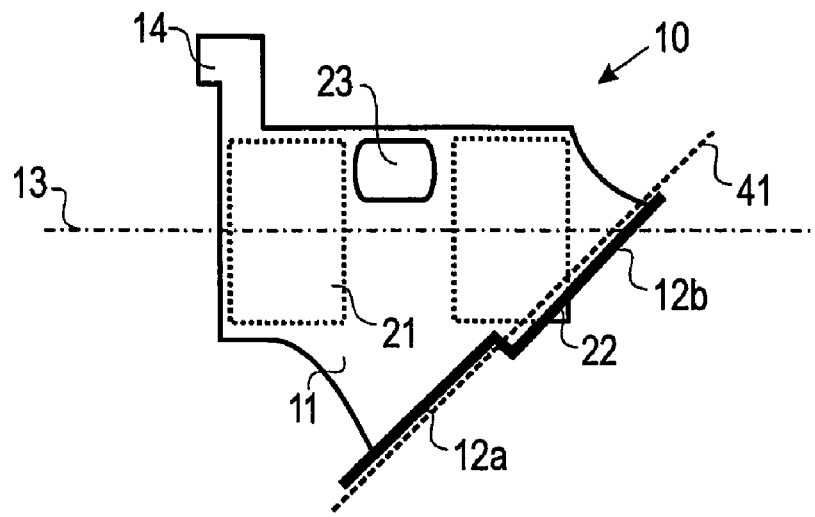
FIG. 4 shows a schematic side view of a further embodiment of a bearing housing.

A further embodiment is shown in FIG. 4. The differences of this bearing housing as compared to FIG. 2 are described in the following. Bearing housing 10 of FIG. 4 has a flange, which includes two segments 12a and 12b. These segments have an offset. In order to define features of the segmented flange in a simplified manner, an average plane can be used. This plane is indicated in FIG. 4 with reference numeral 41.

Figure 5:
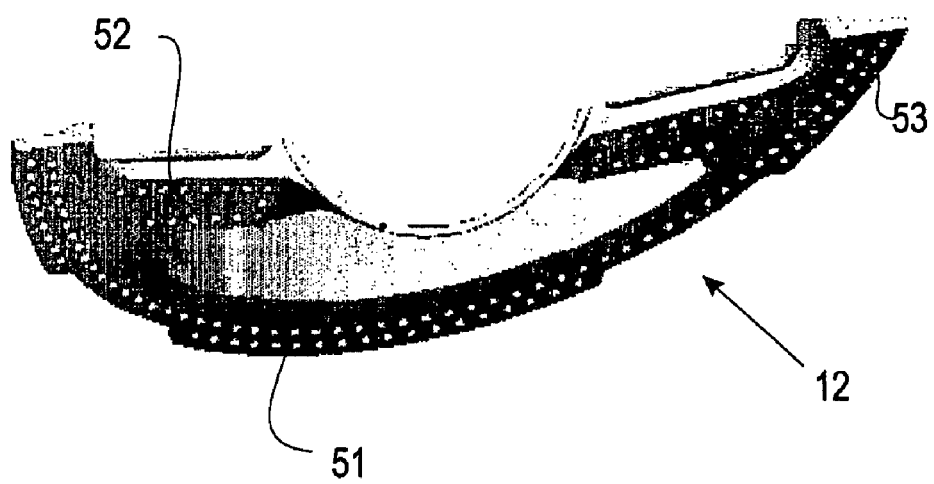
FIG. 5 shows a three-dimensional view of a connecting surface of a flange of a bearing housing.
Figure 6:
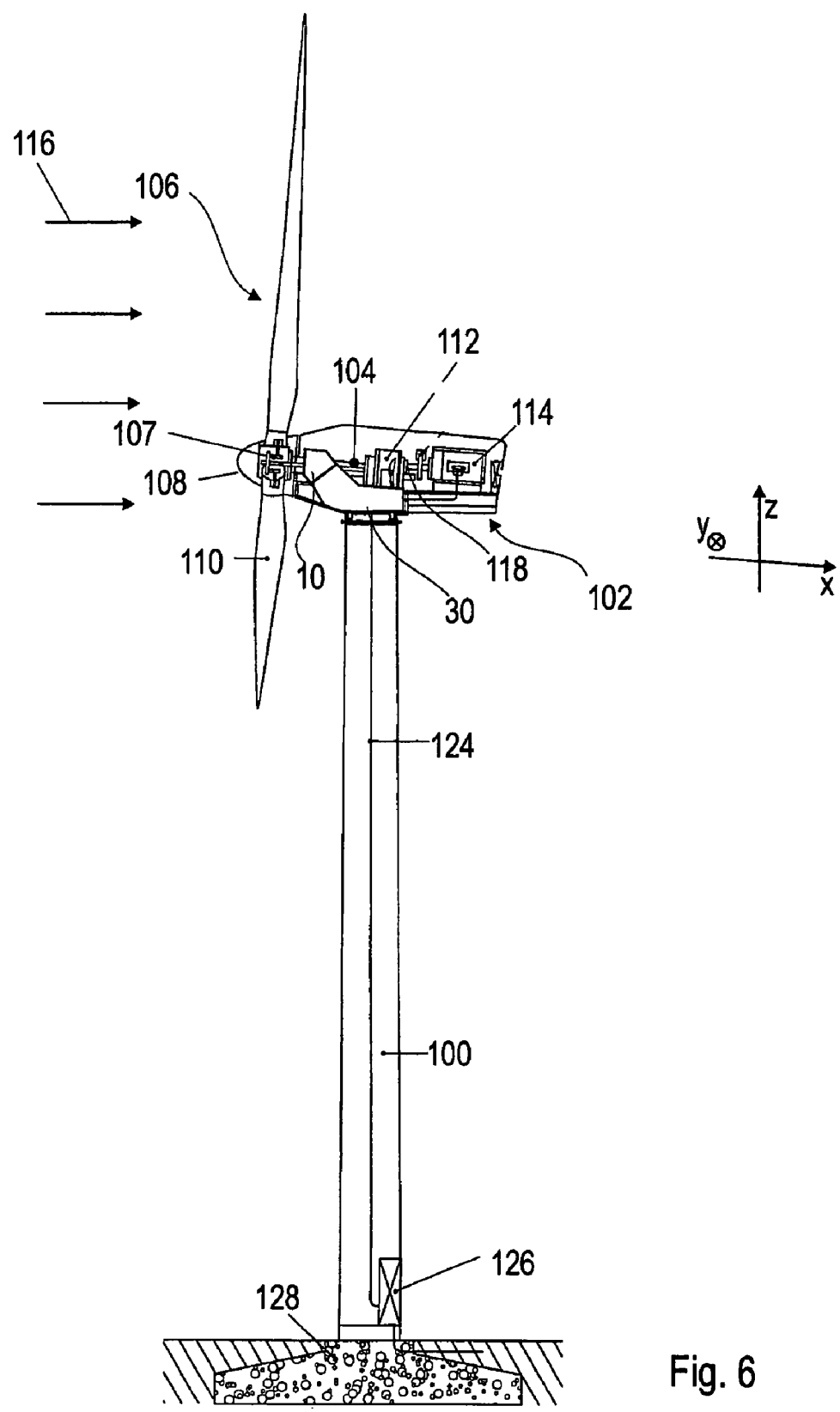
FIG. 6 shows the set-up of a wind turbine.

The flange 12 and the connecting surface can be seen in more detail in FIG. 5. FIG. 5 shows a three-dimensional view from the bottom of flange 12. The flange of the bearing housing has a connecting surface, which can be described as follows. One the one hand, flange 12 includes a curved surface 51. One the other hand, the connecting surface includes two arm-like connecting surfaces 52 towards the inner area of the curve of surface 51.

In this embodiment, the connecting surface of the flange is continuous. That is the contact between the connecting surface of the flange and the connecting surface of a counterpiece flange is continuous. Thereby, this inventive aspect of a continuous connecting surface is to be understood as including minor discontinuities due to comparatively small grooves or recesses. The connecting surface in its entirety should be quasi-continuous.

All areas of the flange with a connecting surface have either one or two rows of openings for fastening means. Appropriate fastening means, like bolts or rivets or the like, can be passed through the openings and corresponding openings in the counterpiece of the flange of the bearing housing. The counterpiece would be a flange of the main frame. The curved portion of the connecting surface 51 has openings for fastening means which are positioned on a bend curve. The curve has a radius of at least 500 mm.

FIG. 5 shows a typical three rotor blade gear wind turbine; which may utilize the bearing housing described above. However, the bearing housing can be integrated to any horizontal rotor shaft wind turbine. The wind turbine includes a nacelle 102 mounted on a tower 100 supported by a foundation 128. The nacelle 102 houses a drive train for transmitting the rotation of a rotor 106 to a drive-shaft 118 of a generator 114. The drive train includes a rotor shaft 104 that connects the rotor 106 to a gearbox 112 in order to increase the rotation of the drive-shaft 118 of the generator 114. The drive-shaft 118 is often called the high-speed shaft and the rotor shaft 104 is known as the low-speed shaft. The rotor shaft 104 is connected to the rotor's hub 108, which generally supports three rotor blades 110. The gearbox can be optionally omitted thereby directly linking rotor 106 to generator 114. This configuration is known as a direct drive generator. The generator 114 feeds the generated electric energy into the power grid via power cables 124 with a grid connection 126 using electrical power devices such as a frequency converter and/or transformer. It is also possible that the electrical energy will be directly consumed by consumers without being fed to a public power grid.

Within FIG. 5, a z-axis defined by the tower is shown. The x-axis, which is defined by the rotor shaft, is essentially perpendicular to the z-axis. That is, the angle between the tower (z-axis) and the rotor shaft (x-axis) is between 90° and 100°. The y-axis is perpendicular to the x-z-plane. The bearing housing 10 can be described as follows with respect to these coordinates. If the rotor shaft axis is located at a y-position 0 and the rotor shaft has a radius r, then the flange of the bearing housing is at least partly located at a z-position below the rotor shaft. The same part is located at a y-position between −r and r.

When an incoming air stream 116 turns the rotor 106, the wind's kinetic energy is converted into rotational energy of the rotor 106 and transmitted by the drive train to the generator, which finally converts the rotational energy into electric energy.

The efficiency of a wind turbine depends on many parameters including the orientation of the nacelle, or more specifically the location of the rotor plane with respect to the direction of the air stream. This is typically controlled by a yaw drive or azimuth-drive, which orients the nacelle into the wind. In modern wind turbines electrical and mechanical components form a yaw drive. More specifically, an electric high-speed drive motor is coupled by a gear reducer having a drive pinion gear engaging a bull gear. Usually the electric drive motor, the gear reducer, and the drive pinion gear are mounted on the nacelle's bedplate while the bull gear is fixed to tower 100. For controlling the yaw-drive a wind-measuring sensor is used, which is capable of measuring the direction of the wind.

A similar configuration applies to a blade pitch drive 107 for adjusting the pitch angle of each of the rotor blades 106. This also dramatically affects the efficiency of the wind turbine.

For the three rotor blade wind turbine as described, the blade pitch system includes three blade pitch drives and three power control. Typically, the power control modules are arranged within the hub near the blade pitch drives.

Besides the rotational energy delivered to the generator and converted to electrical energy, other loads and forces act on the system Loads and forces acting on the rotor shaft 104 are fed over the bearings in the bearing housing. The loads are transmitted over the tower head in the tower and the foundation 128. The load transmittal requires sufficient material strength of the components. Thereby, care needs to be taken to connecting flanges between individual components. The bearing housing 10 and main frame 30 as well as the flanges thereof, which has been described in detail with reference to FIGS. 1a to 3, allow for an optimized load transmittal.

Having thus described the invention in detail, it should be apparent that various modifications can be made in the present invention without departing from the spirit and scope of the following claims.

The invention claimed is:

1. A bearing housing for accommodating a rotor shaft of a wind turbine, comprising:
    a flange for connecting the bearing housing to a main frame of the wind turbine;
    the flange having a connecting surface to be attached to the main frame of the wind turbine, wherein at least parts of the connecting surface, when seen from the top of the bearing housing, would be located below the rotor shaft, wherein the connecting surface of the flange includes a curved surface that extends from a first end to a second end of the flange.

2. The bearing housing according to claim 1, wherein
    the connecting surface is averaged by a plane; and
    wherein the plane is inclined with respect to an axis of the rotor shaft by an angle of at least 20°.

3. The bearing housing according to claim 1, wherein the connecting surface is arranged in one plane.

4. The bearing housing according to claim 1 wherein the bearing housing is essentially a single cast iron component.

5. The bearing housing according to claim 1, wherein the flange comprises openings for fastening means, and wherein at least in sections, these openings are arranged along a curvature of the curved surface.

6. The bearing housing according to claim 1, wherein the bearing housing comprises two bearings for holding the rotor shaft.

7. The bearing housing according to claim 6, wherein the two bearings are a locating bearing and a floating bearing.

8. The bearing housing according to claim 1, wherein the flange has a thickness (d) below 120 mm.

9. The bearing housing according to claim 1, wherein the connecting surface of the flange of the bearing housing is continuous.

10. The bearing housing according to claim 1, wherein the connecting surface of the flange of the bearing housing has an area of at least 1.5 m².

11. A wind turbine comprising:
   a tower defining a z-axis;
   a rotor coupled to the tower;
   a rotor shaft defining an x-axis with the rotor shaft coupled to the rotor, the axis of the rotor shaft being located at a y-position $y_s$ of a y-axis and the rotor shaft having a radius r;
   a main frame; and
   a bearing housing comprising,
      a flange for connecting the bearing housing to the main frame of the wind turbine; the flange having a connecting surface to be attached to the main frame of the wind turbine, wherein at least parts of the connecting surface, when seen from the top of the bearing housing, would be located below the rotor shaft, wherein the connecting surface of the flange includes a curved surface that extends from a first end to a second end of the flange.

12. The wind turbine defined in claim 11 wherein the flange comprises a connecting surface which is partly positioned at a z-position below the rotor shaft and at the same time at a y-position between $y_s-r$ and $y_s+r$.

* * * * *